US012640446B2

(12) United States Patent
Yuan

(10) Patent No.: US 12,640,446 B2
(45) Date of Patent: May 26, 2026

(54) PACKAGING HOUSING, BATTERY, AND ELECTRIC DEVICE

(71) Applicant: Ningde Amperex Technology Limited, Ningde City (CN)

(72) Inventor: Xiulan Yuan, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 508 days.

(21) Appl. No.: 18/128,593

(22) Filed: Mar. 30, 2023

(65) Prior Publication Data

US 2023/0238668 A1     Jul. 27, 2023

Related U.S. Application Data

(63) Continuation of application No. PCT/CN2022/112999, filed on Aug. 17, 2022.

(30) Foreign Application Priority Data

Aug. 17, 2021    (CN) .......................... 202121929405.5

(51) Int. Cl.
H01M 50/30        (2021.01)
H01M 50/186       (2021.01)
H01M 50/54        (2021.01)

(52) U.S. Cl.
CPC ......... H01M 50/54 (2021.01); H01M 50/186 (2021.01)

(58) Field of Classification Search
CPC .... H01M 50/54; H01M 50/186; H01M 50/55; H01M 50/103; H01M 50/193;

(Continued)

(56) References Cited

U.S. PATENT DOCUMENTS 9,093,680 B2 *   7/2015   Ahn ..................... H01M 50/178
2003/0232236 A1   12/2003   Mitchell et al.
(Continued)

FOREIGN PATENT DOCUMENTS

CN        103187177 A      7/2013
CN        106129276 B      8/2019
(Continued)

OTHER PUBLICATIONS

Office Action dated Jun. 4, 2024, issued in counterpart JP Application No. 2022-569630. (5 pages).

(Continued)

*Primary Examiner* — Christian Roldan
(74) *Attorney, Agent, or Firm* — WHDA, LLP

(57)        ABSTRACT

A cell includes an electrode assembly and a tab electrically connected to the electrode assembly, the packaging housing includes a housing body, a cover, and a polymer layer. The housing body is provided with an accommodating portion, where the accommodating portion is configured to accommodate the electrode assembly, the tab extends from the accommodating portion to the outside of the housing body, and the housing body is further provided with a first sealing portion extending from an edge of an opening of the accommodating portion to the outside of the housing body along a first direction. The cover is provided with a second sealing portion extending along the first direction. The cover covers the opening of the accommodating portion, and the first sealing portion and the second sealing portion are disposed opposite to each other. The polymer layer is disposed between the first sealing portion and the second sealing portion.

13 Claims, 11 Drawing Sheets

(58) Field of Classification Search
CPC ............. H01M 50/198; H01M 50/121; H01M 50/124; H01M 50/30; Y02E 60/10
USPC ......................................................... 429/163
See application file for complete search history.

(56) References Cited

U.S. PATENT DOCUMENTS

| | | | |
|---|---|---|---|
| 2004/0091786 A1* | 5/2004 | Unoki ............... | H01M 10/0567 429/327 |
| 2007/0196733 A1 | 8/2007 | Lee | |
| 2008/0124614 A1 | 5/2008 | Cheon et al. | |
| 2008/0233468 A1 | 9/2008 | Otohata et al. | |
| 2011/0151292 A1 | 6/2011 | Song | |
| 2013/0115491 A1 | 5/2013 | Bhardwaj et al. | |
| 2018/0254448 A1* | 9/2018 | Aya ........................ | H01G 11/12 |
| 2022/0320567 A1* | 10/2022 | Lee ................... | H01M 10/0427 |

FOREIGN PATENT DOCUMENTS

| | | | |
|---|---|---|---|
| CN | 112259842 A | 1/2021 | |
| CN | 215896547 U | 2/2022 | |
| JP | 2001093489 A | † | 4/2001 |
| JP | 2006-054099 A | | 2/2006 |
| JP | 2006-108097 A | | 4/2006 |
| KR | 20010097437 A | | 11/2001 |
| WO | 2021033939 A1 | | 2/2021 |
| WO | 2021/201213 A1 | | 10/2021 |

OTHER PUBLICATIONS

Extended (Supplementary) European Search Report dated Dec. 19, 2024, issued in counterpart EP Application No. 22857844.9. (8 pages).
Notice of Allowance dated Nov. 26, 2024, issued in counterpart JP Application No. 2022-569630. (3 pages).
International Search Report dated Oct. 25, 2022, issued in counterpart Application No. PCT/CN2022/112999. (6 pages).
Office Action dated Dec. 26, 2023, issued in counterpart JP Application No. 2022-569630, with English translation. (10 pages).
Office Action dated Feb. 13, 2026, issued in counterpart IN Application No. 202317002656, with English translation. (8 pages).

\* cited by examiner
† cited by third party

PACKAGING HOUSING, BATTERY, AND ELECTRIC DEVICE

CROSS-REFERENCE TO RELATED APPLICATIONS

This application is a continuation of International Application No. PCT/CN2022/112999, filed on Aug. 17, 2022, which claims the priority to Chinese Application No. 202121929405.5, filed on Aug. 17, 2021 and entitled "PACKAGING HOUSING, BATTERY, AND ELECTRIC DEVICE", the contents of which is incorporated herein by reference in its entirety.

TECHNICAL FIELD

This application relates to the field of battery technologies, and in particular, to a packaging housing, a battery, and an electric device.

BACKGROUND

A battery generally includes a cell and a packaging housing accommodating the cell. The existing packaging housings are generally metal structures, and are usually charged during packaging. For some packaging housings, their bodies are of one polarity, and the other polarity is led out through poles. For some packaging housings, their upper and lower housings are of different polarities, which are isolated by insulating sheets. To improve the safety of batteries including packaging housings and cells, it is necessary to conduct additional insulation treatments for packaging housings and etch weak areas on the packaging housings as pressure relief valves to release gas from the packaging housings in a timely manner, leading to relatively high production costs.

SUMMARY

In view of this, it is necessary to provide a packaging housing that can reduce production costs, a battery using such packaging housing, and an electric device.

An embodiment of this application provides a packaging housing for packaging a cell. The cell includes an electrode assembly and a tab electrically connected to the electrode assembly, and the packaging housing includes a housing body, a cover, and a polymer layer. The housing body is provided with an accommodating portion, where the accommodating portion is configured to accommodate the electrode assembly, the tab extends from the accommodating portion to the outside of the housing body, and the housing body is further provided with a first sealing portion extending from an edge of an opening of the accommodating portion to the outside of the housing body along a first direction. The cover is provided with a second sealing portion extending along the first direction. The cover covers the opening of the accommodating portion, and the first sealing portion and the second sealing portion are disposed opposite to each other. The polymer layer is disposed between the first sealing portion and the second sealing portion. The polymer layer is configured to seal a gap between the first sealing portion and the second sealing portion. When pressure of gas generated by the cell inside the packaging housing exceeds a threshold, the polymer layer is further configured to release the gas from the packaging housing.

Technical effects of embodiments of this application: The first sealing portion and the second sealing portion are disposed opposite to each other, and the polymer layer is disposed between the first sealing portion and the second sealing portion, which improves sealing performance of the packaging housing. In addition, when pressure of gas generated by the cell inside the packaging housing exceeds the threshold, the polymer layer is further configured to release the gas from the packaging housing, implementing timely pressure relief of the packaging housing and improving use safety. Compared with the existing method of disposing a pressure relief valve on the packaging housing, the packaging housing in the embodiments of this application can reduce production costs while improving safety.

In some embodiments of this application, the tab protrudes from the polymer layer to the outside of the housing body to improve sealing performance between the tab and the packaging housing.

In some embodiments of this application, the edge of the opening of the accommodating portion includes a first edge and a second edge that are connected end to end, the first sealing portion extends from the first edge along the first direction, the housing body is further provided with a first connecting zone, the first connecting zone is provided on the second edge, a surface of the cover facing towards the accommodating portion is provided with a second connecting zone overlapping with the first connecting zone, and the first connecting zone and the second connecting zone are welded to form a welded connecting layer to improve the stability of the connection and sealing between the cover and the housing body. In addition, compared with the manner of folded edge, providing the first connecting zone on the second edge to fully use a surface on the edge of the opening facing towards the cover can reduce the space occupied by the packaging housing and increase the energy density of the battery.

In some embodiments of this application, the second edge of the opening of the accommodating portion bends outward to form a bending portion, and the first connecting zone is provided on a surface of the bending portion facing towards the cover. Through the bending portion, a contact area between the housing body and the cover is increased, and therefore a contact area between the first connecting zone and the second connecting zone can be increased, further improving the stability of the connection and sealing between the cover and the housing body.

In some embodiments of this application, the housing body is further provided with a first dispensing zone. The first dispensing zone is provided in an intersection area between the first edge and the second edge. The surface of the cover facing towards the accommodating portion is provided with a second dispensing zone overlapping with the first dispensing zone. The first dispensing zone and the second dispensing zone form a dispensing connecting layer through dispensing to improve stability of the connection and sealing between the cover and the housing body in the corresponding intersection area, thereby improving the stability of the connection and sealing at the intersection between the welded connecting layer and a melting layer.

In some embodiments of this application, the packaging housing further includes a tab adhesive layer, where the tab adhesive layer is disposed between the polymer layers, and the tab protrudes from the tab adhesive layer to the outside of the housing body. The tab adhesive layer is configured to improve sealing performance between the tab and the polymer layer.

In some embodiments of this application, the first sealing portion includes a first surface and a second surface. The first surface faces toward the second sealing portion, and the second surface connects to a side of the first surface far away from the accommodating portion. The first surface and the second surface are connected to form a first step face. The first step face is sealedly connected to the polymer layer. When pressure of gas generated by the cell inside the packaging housing exceeds the threshold, the polymer layer is burst open through an opening of the first step face on the second surface to release the gas from the packaging housing, improving use safety of the battery.

In some embodiments of this application, the second sealing portion includes a third surface and a fourth surface. The third surface faces toward the first surface, and the fourth surface connects to a side of the third surface corresponding to the second surface. The third surface and the fourth surface are connected to form a second step face. The second step face is sealedly connected to the polymer layer. When pressure of gas generated by the cell inside the packaging housing exceeds the threshold, the polymer layer is burst open through an opening of the second step face on the fourth surface to release the gas from the packaging housing, improving use safety of the battery.

An embodiment of this application further provides a battery, including a cell and the packaging housing according to any one of the foregoing embodiments.

An embodiment of this application further provides an electric device, including the battery according to any one of the foregoing embodiments.

In the packaging housing provided in the embodiments of this application, the battery using such packaging housing, and the electric device, the first sealing portion and the second sealing portion are disposed opposite to each other, and the polymer layer is disposed between the first sealing portion and the second sealing portion, improving sealing performance of the packaging housing. In addition, when pressure of gas generated by the cell inside the packaging housing exceeds the threshold, the polymer layer is further configured to release the gas from the packaging housing, implementing timely pressure relief of the packaging housing and improving use safety. Compared with the existing method of disposing a pressure relief valve on the packaging housing, the packaging housing in the embodiments of this application can reduce production costs while improving safety.

REFERENCE SIGNS OF MAIN COMPONENTS

Figure 1:
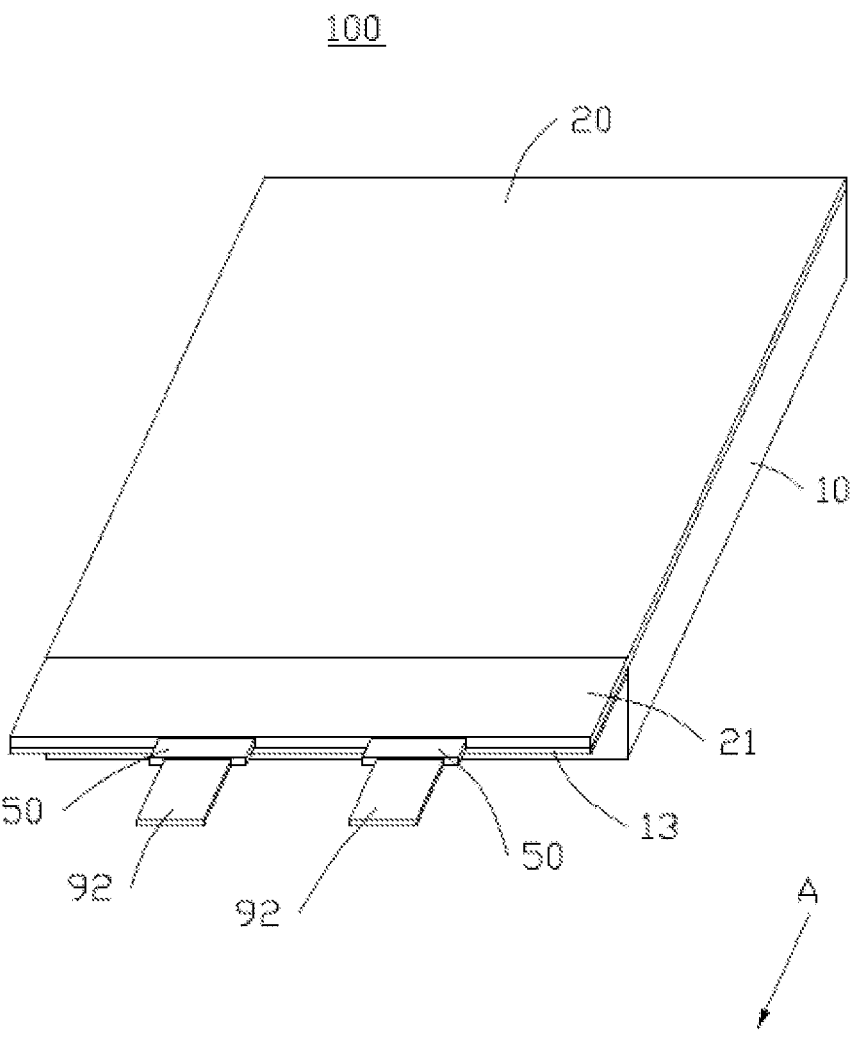
FIG. 1 is a first schematic structural diagram of a packaging housing according to an embodiment of this application.

Packaging housing 100
Housing body 10
Accommodating portion 11
Opening 12
First edge 121
Second edge 122
Intersection area 123
First sealing portion 13
First surface 131
Second surface 132
First step face 133
First separate portion 13*a*
Second separate portion 13*b*
First area 13*c*
Second area 13*d*
First portion 13*e*
Second portion 13*f*
First connecting zone 14
First dispensing zone 15
Cover 20
Second sealing portion 21
Third surface 211
Fourth surface 212
Second step face 213
Third separate portion 21*a*
Fourth separate portion 21*b*
Third area 21*c*
Fourth area 21*d*
Third portion 21*e*
Fourth portion 21*f*
Second connecting zone 22
Second dispensing zone 23
Polymer layer 30
First melting layer 31
Second melting layer 32
Tab adhesive layer 50
Cell 90
Electrode assembly 91
Tab 92
Fifth portion 92*a*
Sixth portion 92*b*
First direction A
Second direction B

DETAILED DESCRIPTION

The following describes the technical solutions in the embodiments of this application with reference to the accompanying drawings in the embodiments of this application. Apparently, the described embodiments are only some rather than all of the embodiments of this application.

It should be noted that when a component is deemed as being "connected to" another component, it may be directly connected to another component, or there may be a component disposed in between. When a component is deemed as being "disposed" on another component, it may be directly disposed on another component, or there may be a component disposed in between.

Unless otherwise defined, all technical and scientific terms used herein shall have the same meanings as commonly understood by those skilled in the art to which this application belongs. The terms used herein in the specification of this application are only used to describe specific embodiments, and are not intended to limit this application.

It can be understood that when two components are disposed parallel/perpendicular to each other, an angular tolerance of 0—±10% is allowed between the two components. To be specific, an angular tolerance of ±18° exists when the two components are parallel to each other, and an angular tolerance of ±9° exists when the two components are perpendicular to each other. A value greater than, equal to or less than an endpoint value should be understood that a tolerance of 0—±10% of the endpoint value is allowed.

An embodiment of this application provides a packaging housing for packaging a cell. The cell includes an electrode assembly and a tab electrically connected to the electrode assembly, and the packaging housing includes a housing body, a cover, and a polymer layer. The housing body is provided with an accommodating portion, where the accommodating portion is configured to accommodate the electrode assembly, the tab extends from the accommodating portion to the outside of the housing body, and the housing body is further provided with a first sealing portion extending from an edge of an opening of the accommodating portion to the outside of the housing body along a first direction. The cover is provided with a second sealing portion extending along the first direction. The cover covers the opening of the accommodating portion, and the first sealing portion and the second sealing portion are disposed opposite to each other. The polymer layer is disposed between the first sealing portion and the second sealing portion. The polymer layer is configured to seal a gap between the first sealing portion and the second sealing portion. When pressure of gas generated by the cell inside the packaging housing exceeds a threshold, the polymer layer is further configured to release the gas from the packaging housing.

In the packaging housing provided in the embodiments of this application, a battery using such packaging housing, and an electric device, the first sealing portion and the second sealing portion are disposed opposite to each other, and the polymer layer is disposed between the first sealing portion and the second sealing portion, improving sealing performance of the packaging housing. In addition, when pressure of gas generated by the cell inside the packaging housing exceeds the threshold, the polymer layer is further configured to release the gas from the packaging housing, implementing timely pressure relief of the packaging housing and improving use safety. Compared with the existing method of disposing a pressure relief valve on the packaging housing, the packaging housing in the embodiments of this application can reduce production costs while improving safety.

The following describes in detail some embodiments with reference to the accompanying drawings. In absence of conflicts, the following embodiments and features in the embodiments may be combined.

Figure 2:
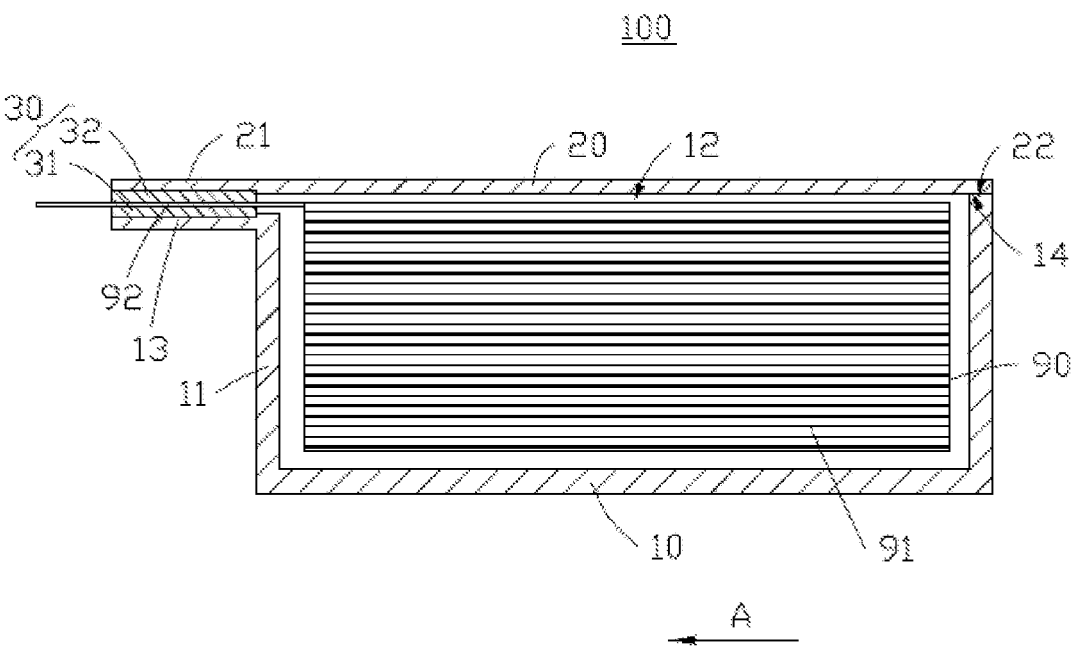
FIG. 2 is a first schematic structural sectional view of a packaging housing according to an embodiment of this application.

Referring to FIG. 1 and FIG. 2, an embodiment of this application provides a packaging housing 100 for packaging a cell 90. The cell 90 includes an electrode assembly 91 and a tab 92 electrically connected to the electrode assembly 91. The electrode assembly 91 may be formed by stacking in sequence or winding a positive electrode plate, a separator, and a negative electrode plate.

The packaging housing 100 includes a housing body 10, a cover 20, and a polymer layer 30. The housing body 10 is provided with an accommodating portion 11, and the accommodating portion 11 is configured to accommodate the electrode assembly 91. In some embodiments, the accommodating portion 11 is a recessed portion disposed on the housing body 10, and the electrode assembly 91 is put into the housing body 10 through an opening 12 of the accommodating portion 11 (that is, an opening of the recessed portion). The tab 92 extends from the accommodating portion 11 to the outside of the housing body 10.

The housing body 10 is further provided with a first sealing portion 13 extending from an edge of the opening 12 of the accommodating portion 11 to the outside of the housing body 10 along a first direction A. The cover 20 is provided with a second sealing portion 21 extending along the first direction A. The cover 20 covers the opening 12 of the accommodating portion 11 to protect the electrode assembly 91 in the accommodating portion 11. The first sealing portion 13 and the second sealing portion 21 are disposed opposite to each other.

The polymer layer 30 is disposed between the first sealing portion 13 and the second sealing portion 21. The polymer layer 30 is configured to seal a gap between the first sealing portion 13 and the second sealing portion 21. When pressure of gas generated by the cell 90 inside the packaging housing 100 exceeds a threshold, the polymer layer 30 is further configured to release the gas from the packaging housing 100.

In some embodiments, the threshold is a pressure value of the gas generated inside the packaging housing 100 when thermal runaway occurs on the cell 90. A melting point of the polymer layer 30 is not higher than a thermal runaway temperature of the cell 90. When the thermal runaway of the cell 90 increases air pressure inside the packaging housing 100, the polymer layer 30 is melted by heat such that the first sealing portion 13 and the second sealing portion 21 are no longer sealed, implementing timely pressure relief of the packaging housing 100 and improving use safety.

In some embodiments, a melting point of the polymer layer 30 is 130° C. to 150° C., and may specifically be one of 130° C., 135° C., 140° C., 145° C., 150° C., and the like.

In the foregoing packaging housing 100, the first sealing portion 13 and the second sealing portion 21 are disposed opposite to each other, and the polymer layer 30 is disposed between the first sealing portion 13 and the second sealing portion 21, improving sealing performance of the packaging housing 100. In addition, when pressure of gas generated by the cell 90 inside the packaging housing 100 exceeds the threshold, the polymer layer 30 is further configured to release the gas from the packaging housing 100, implementing timely pressure relief of the packaging housing 100 and improving use safety. Compared with the existing method of disposing a pressure relief valve on the packaging housing, the packaging housing 100 in the embodiment of this application can reduce production costs while improving safety.

Still referring to FIG. 2, in some embodiments, the tab 92 is led out from between the first sealing portion 13 and the second sealing portion 21, and protrudes from the polymer layer 30 to the outside of the housing body 10, so as to improve sealing performance between the tab 92 and the packaging housing 100. In some embodiments, the tab 92 protrudes from the polymer layer 30 along the first direction A.

In some embodiments, the polymer layer 30 has insulation properties to keep the tab 92 insulated from the housing body 10 and the cover 20, which reduces the risk of the tab 92 being electrically connected to the housing body 10 and the cover 20 so that the packaging housing 100 is not charged. In this way, production costs for insulating the packaging housing are reduced, and production efficiency can be improved.

Still referring to FIG. 2, in some embodiments, the polymer layer 30 includes a first melting layer 31 and a second melting layer 32. The first melting layer 31 is disposed on a surface of the first sealing portion 13 facing towards the second sealing portion 21. The second melting layer 32 is disposed on a surface of the second sealing portion 21 facing towards the first sealing portion 13. The first melting layer 31 and the second melting layer 32 are configured to be melted by heat to form the polymer layer 30, so as to seal a gap between the tab 92, the first sealing portion 13, and the second sealing portion 21. In some embodiments, the first melting layer 31 and the second melting layer 32 are melted by heat by hot pressing the first sealing portion 13 and the second sealing portion 21.

Figure 3:
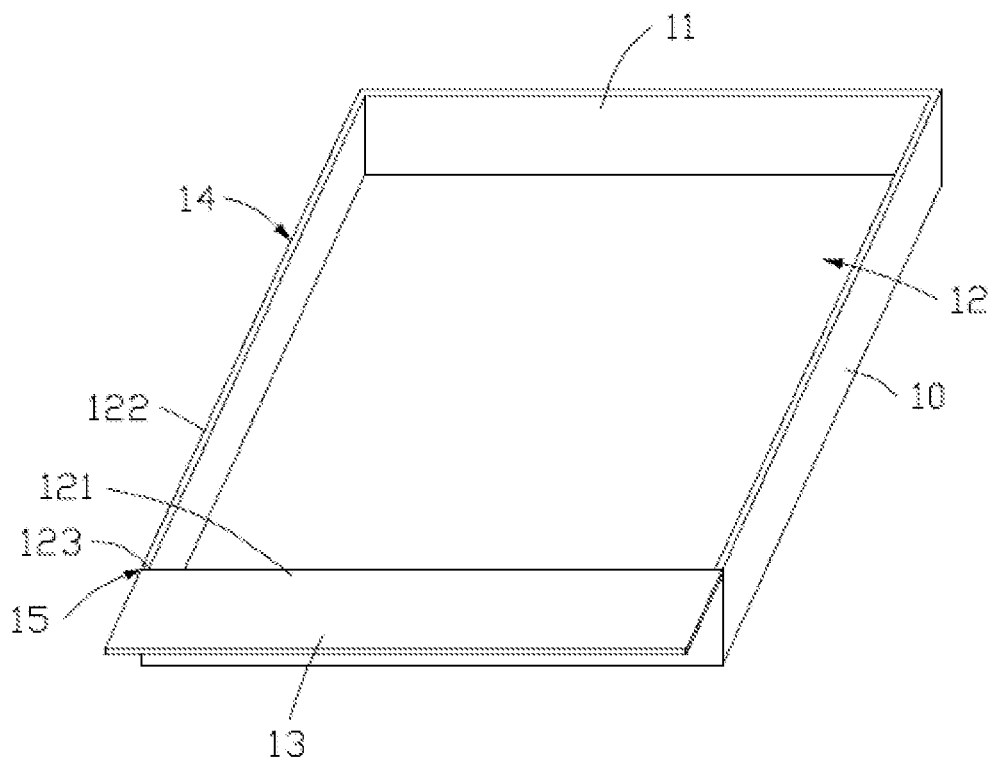
FIG. 3 is a first schematic structural diagram of a housing body in a packaging housing according to an embodiment of this application.
Figure 4:
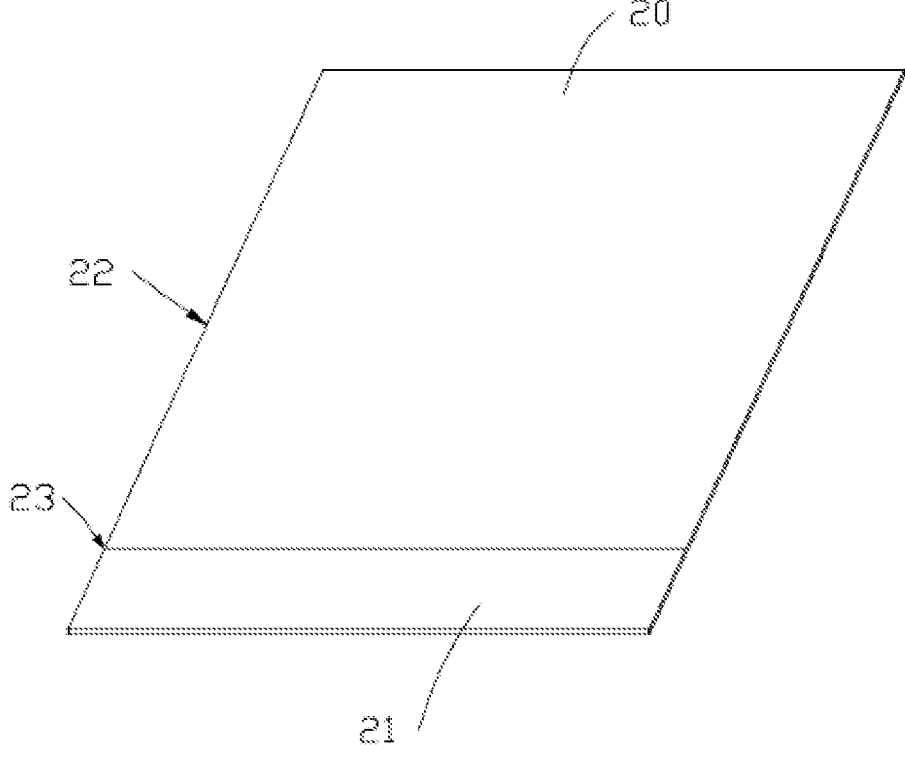
FIG. 4 is a first schematic structural diagram of a cover in a packaging housing according to an embodiment of this application.

Referring to FIG. 3 and FIG. 4, in some embodiments, the edge of the opening 12 of the accommodating portion 11 includes a first edge 121 and a second edge 122 that are connected end to end. The first sealing portion 13 extends from the first edge 121 along the first direction A. The housing body 10 is further provided with a first connecting zone 14, and the first connecting zone 14 is provided on the second edge 122. A surface of the cover 20 facing towards the accommodating portion 11 is provided with a second connecting zone 22 overlapping with the first connecting zone 14.

The first connecting zone 14 and the second connecting zone 22 are welded to form a welded connecting layer to improve stability of the connection and sealing between the cover 20 and the housing body 10. In addition, compared with the manner of folded edge, providing the first connecting zone 14 on the second edge 122 to fully use a surface on the edge of the opening 12 facing towards the cover 20 can reduce the space occupied by the packaging housing 100 and increase the energy density of the battery.

In some embodiments, the opening 12 has rectangular edges, with the first edge 121 being one side of the rectangle and the second edge being the other three sides of the rectangle.

It can be understood that in other embodiments, the second edge 122 of the opening 12 of the accommodating portion 11 bends outward to form a bending portion (not shown), and the first connecting zone 14 is provided on a surface of the bending portion facing towards the cover 20. Through the bending portion, the contact area between the housing body 10 and the cover 20 is increased, and therefore the contact area between the first connecting zone 14 and the second connecting zone 22 can be increased, further improving the stability of the connection and sealing between the cover 20 and the housing body 10.

In some examples, the housing body 10 is further provided with a first dispensing zone 15. The first dispensing zone 15 is provided in an intersection area 123 between the first edge 121 and the second edge 122. A surface of the cover 20 facing towards the accommodating portion 11 is provided with a second dispensing zone 23 overlapping with the first dispensing zone 15.

The first dispensing zone 15 and the second dispensing zone 23 form a dispensing connecting layer through dispensing to improve the stability of the connection and sealing between the cover 20 and the housing body 10 in the corresponding intersection area 123, thereby improving the stability of the connection and sealing at the intersection of the welded connecting layer and the polymer layer 30.

Figure 5:
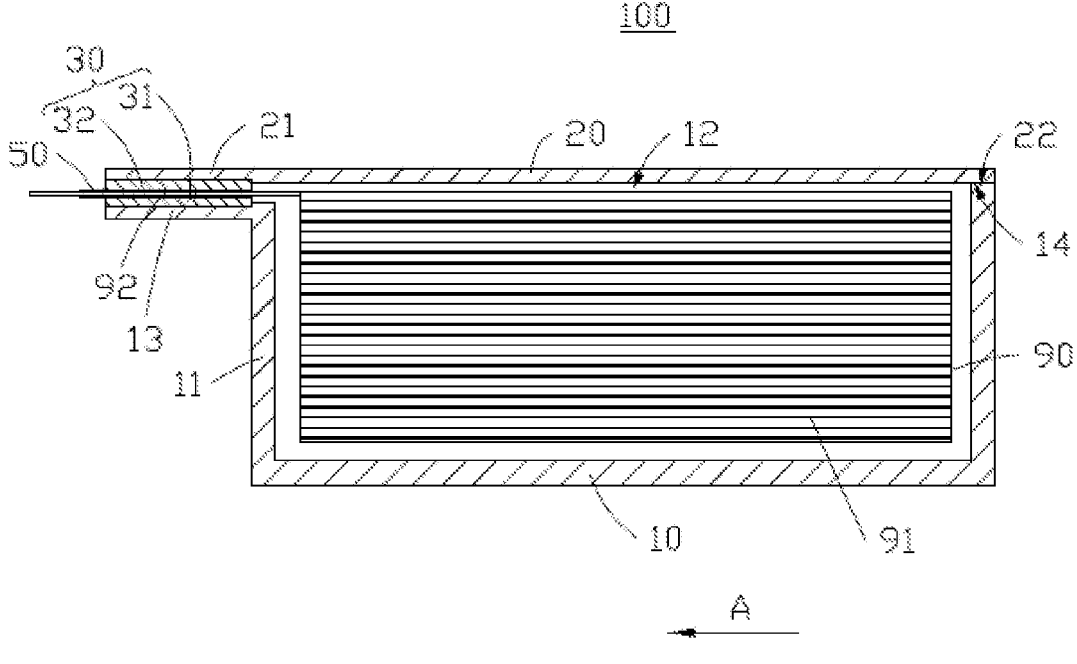
FIG. 5 is a second schematic structural sectional view of a packaging housing according to an embodiment of this application.

Referring to FIG. 5, in some embodiments, the packaging housing 100 further includes a tab adhesive layer 50. The tab adhesive layer 50 is disposed between the polymer layers 30, and the tab 92 protrudes from the tab adhesive layer 50 to the outside of the housing body 10. The tab adhesive layer 50 is configured to improve sealing performance between the tab 92 and the polymer layer 30.

Specifically, in some embodiments, the tab adhesive layer 50 is disposed between the first melting layer 31 and the second melting layer 32, and the tab 92 protrudes from the tab adhesive layer 50. The first melting layer 31, the second melting layer 32, and the tab adhesive layer 50 are configured to be melted by heat to seal the gap between the tab 92 and the first sealing portion 13 and the second sealing portion 21. The first melting layer 31, the second melting layer 32, and the tab adhesive layer 50 are melted synchronously, improving the sealing performance between the tab 92 and the polymer layer 30 and further improving sealing performance of the packaging housing 100.

In some embodiments, the tab adhesive layer 50 has insulation properties to keep the tab 92 insulated from the housing body 10 and the cover 20, which further reduces the risk of the tab 92 being electrically connected to the housing body 10 and the cover 20 so that the packaging housing 100 is not charged.

Figure 6:
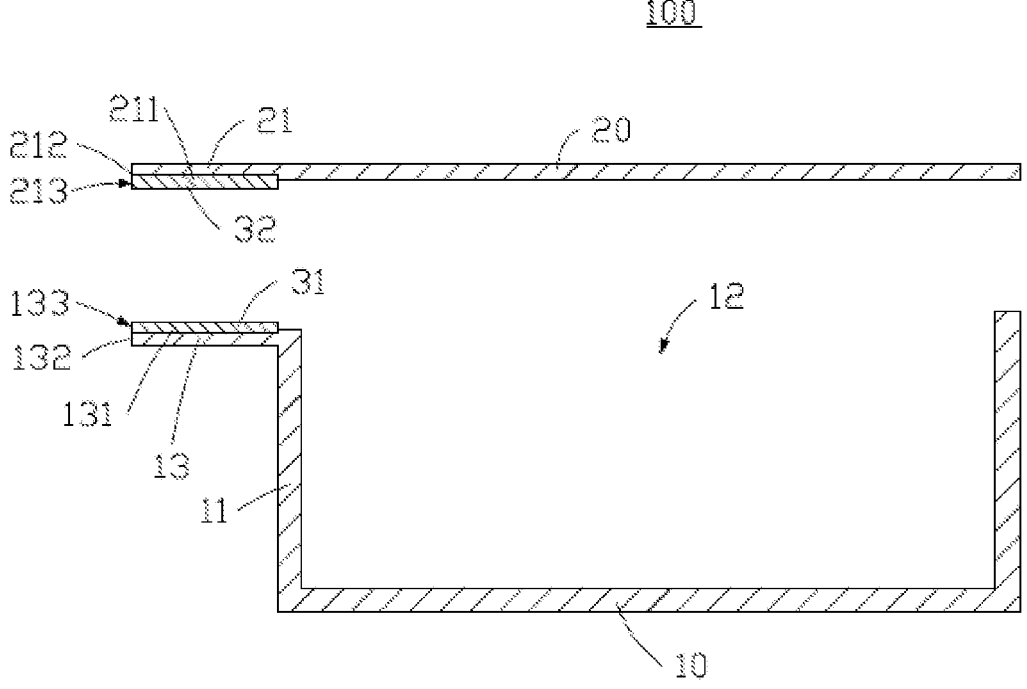
FIG. 6 is a schematic structural sectional view of a housing body and a cover in a packaging housing according to an embodiment of this application.

Still referring to FIG. 6, in some embodiments, the first sealing portion 13 includes a first surface 131 and a second surface 132. The first surface 131 faces toward the second sealing portion 21, and the second surface 132 connects to a side of the first surface 131 far away from the accommodating portion 11. The first surface 131 and the second surface 132 are connected to form a first step face 133. The first step face 133 is sealedly connected to the polymer layer 30. When pressure of gas generated by the cell 90 inside the packaging housing 100 exceeds the threshold, the polymer layer 30 is burst open through an opening of the first step face 133 on the second surface 132 to release the gas from the packaging housing 100, improving use safety of the battery.

In some embodiments, the first melting layer 31 is disposed on the first step face 133. The first melting layer 31 is applied on the first step face 133 and is flush with the first surface 131 to prevent the thickness of the first melting layer 31 from affecting the welding flatness between the first connecting zone 14 and the second connecting zone 22, thereby improving the stability of the connection and sealing between the cover 20 and the housing body 10.

Still referring to FIG. 6, in some embodiments, the second sealing portion 21 includes a third surface 211 and a fourth surface 212. The third surface 211 faces toward the first surface 131, and the fourth surface 212 connects to a side of the third surface 211 corresponding to the second surface 132. The third surface 211 and the fourth surface 212 are connected to form a second step face 213. The second step face 213 is sealedly connected to the polymer layer 30. When pressure of gas generated by the cell 90 inside the packaging housing 100 exceeds the threshold, the polymer layer 30 is burst open through an opening of the second step face 213 on the fourth surface 212 to release the gas from the packaging housing 100, improving use safety of the battery.

In some embodiments, the second melting layer 32 is disposed on the second step face 213. The second melting layer 32 is applied on the second step face 213 and is flush with the third face 211 to prevent the thickness of the second melting layer 32 from affecting the welding flatness between the first connecting zone 14 and the second connecting zone 22, thereby improving the stability of the connection and sealing between the cover 20 and the housing body 10.

Figure 7:
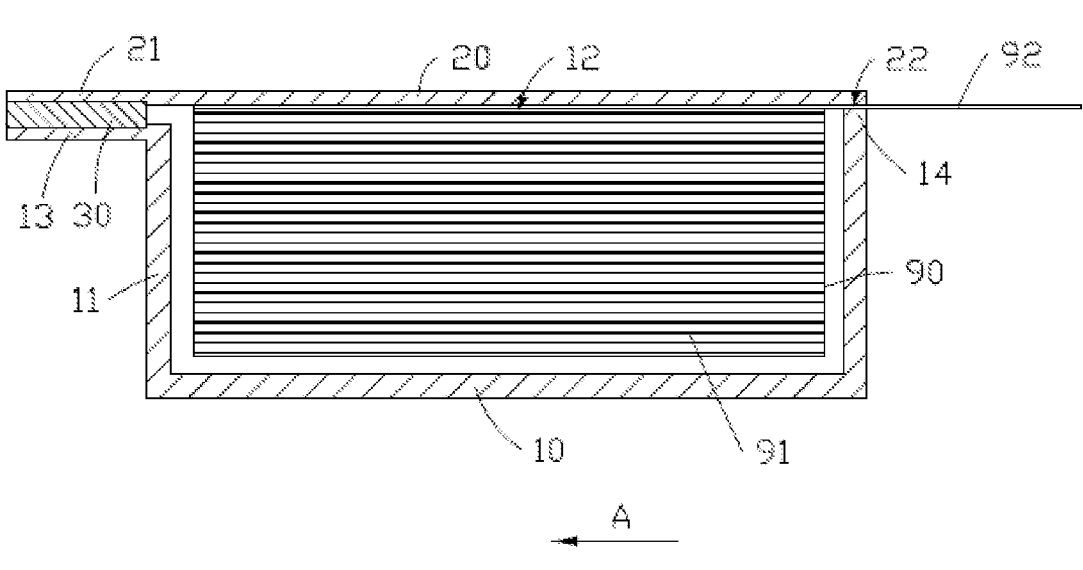
FIG. 7 is a second schematic structural diagram of a packaging housing according to an embodiment of this application.

Referring to FIG. 7, in some embodiments, the first sealing portion 13 extends from the first edge 121 along the first direction A, and the tab 92 extends from the second edge 122 to the outside of the housing body 10. In other words, the tab 92 protrudes from the welded connecting layer to the outside of the housing body 10. The welded connecting layer is configured to improve sealing performance between the tab 92 and the packaging housing 100. The polymer layer 30 is configured to seal a gap between the first sealing portion 13 and the second sealing portion 21. When pressure of gas generated by the cell 90 inside the packaging housing 100 exceeds the threshold, the polymer layer 30 is further configured to release the gas from the packaging housing 100.

In some embodiments, the tab 92 protrudes from the welded connecting layer along an opposite direction of the first direction A.

Figure 8:
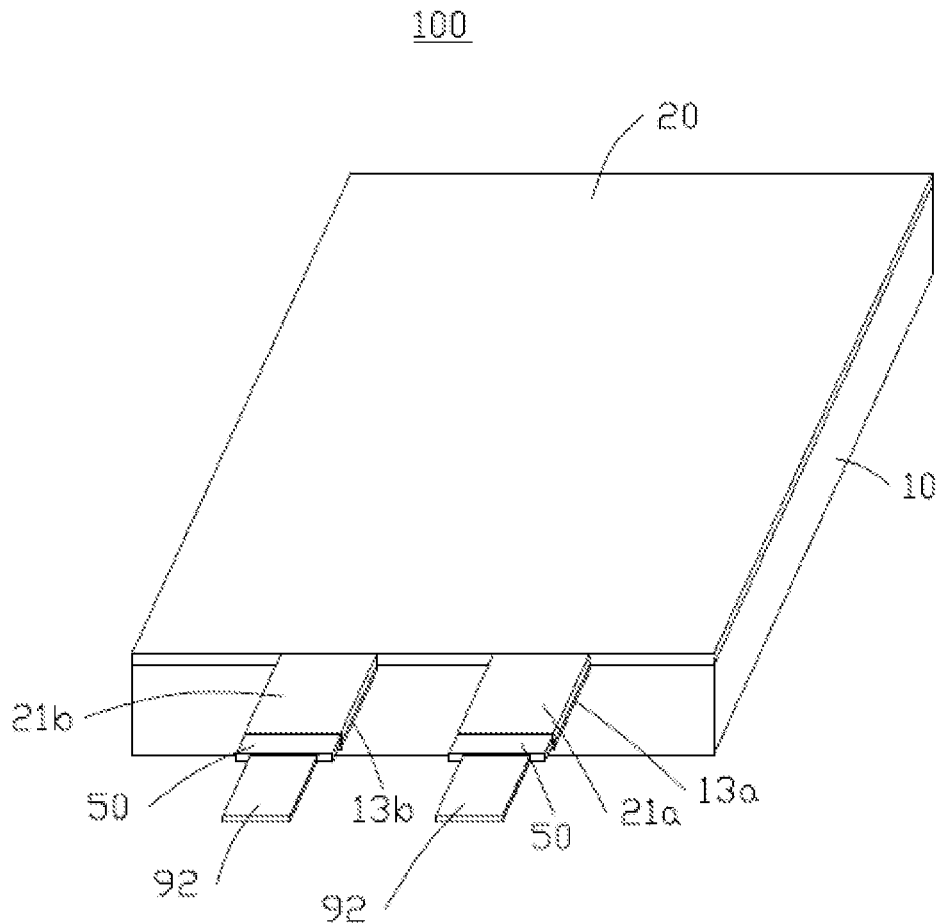
FIG. 8 is a third schematic structural diagram of a packaging housing according to an embodiment of this application.

Referring to FIG. 8, in some embodiments, both the first sealing portion 13 and the second sealing portion 21 are separate structures. The first sealing portion 13 includes a first separate portion 13a and a second separate portion 13b that are spaced apart along the first direction A. The second sealing portion 21 includes a third separate portion 21a and a fourth separate portion 21b, and the third separate portion 21a and the fourth separate portion 21b are disposed opposite to the first separate portion 13a and the second separate portion 13b respectively.

The polymer layer 30 is provided between the first separate portion 13a and the third separate portion 21a for one tab 92 to run through the polymer layer 30. The polymer layer 30 is provided between the second separate portion 13b and the fourth separate portion 21b for another tab 92 to run through, so as to reduce the space occupied by the first sealing portion 13 and the second sealing portion 21 and increase energy density of the battery.

In some embodiments, the first edge 121 exposed between the first separate portion 13a and the second separate portion 13b is sealedly connected to a corresponding area of the cover 20 by welding and/or dispensing.

Figure 9:
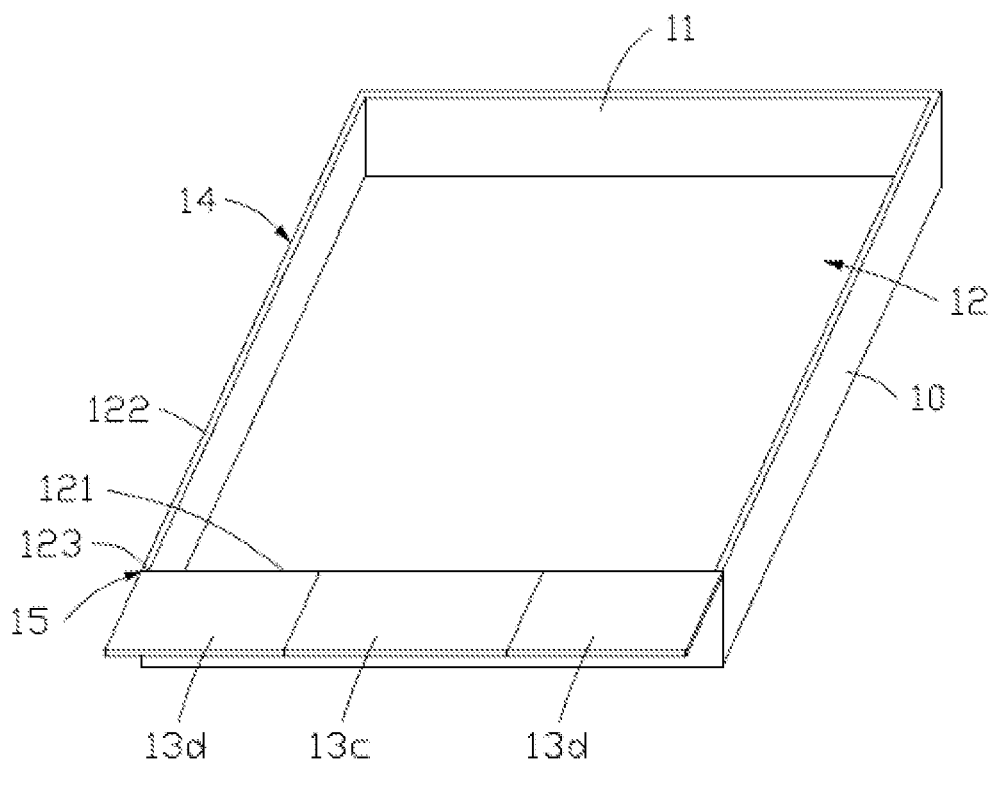
FIG. 9 is a second schematic structural diagram of a housing body in a packaging housing according to an embodiment of this application.
Figure 10:
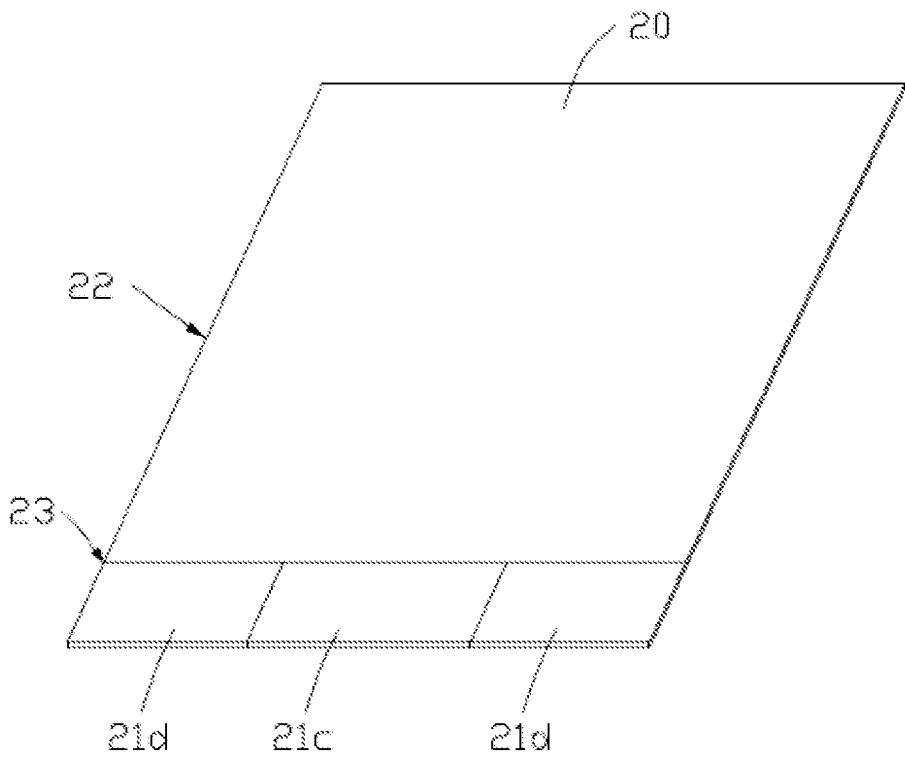
FIG. 10 is a second schematic structural diagram of a cover in a packaging housing according to an embodiment of this application.

Referring to FIG. 9 and FIG. 10, in some embodiments, the surface of the first sealing portion 13 facing towards the second sealing portion 21 is provided with a first area 13c and a second area 13d. The surface of the second sealing portion 21 facing towards the first sealing portion 13 is provided with a third area 21c and a fourth area 21d, and the third area 21c and the fourth area 21d are disposed opposite to the first area 13c and the second area 13d respectively. The polymer layer 30 is provided between the first sealing portion 13 and the third area 21c for one tab 92 to run through. The second area 13d and the fourth area 21d are sealedly connected by welding and/or dispensing.

Figure 11:
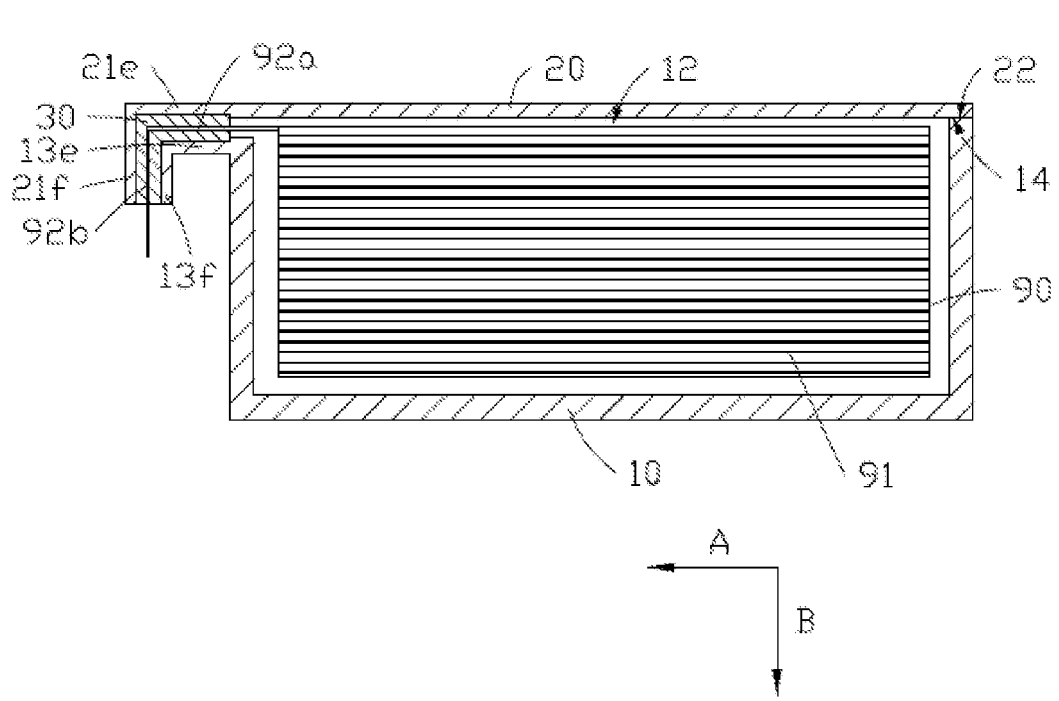
FIG. 11 is a fourth schematic structural diagram of a packaging housing according to an embodiment of this application.

Referring to FIG. 11, in some embodiments, the first sealing portion 13 includes a first portion 13e and a second portion 13f, the first portion 13e extends along the first direction A, and the second portion 13f extends along a second direction B, where the second direction B is a thickness direction of the cell 90, and the second direction B is perpendicular to the first direction A. The second sealing portion 21 includes a third portion 21e and a fourth portion 21f, and the third portion 21e and the fourth portion 21f are disposed opposite to the first portion 13e and the second portion 13f respectively. The polymer layer 30 is disposed between the first sealing portion 13 and the second sealing portion 21.

The tab 92 includes a fifth portion 92a and a sixth portion 92b, the fifth portion 92a extends along the first direction A, and the sixth portion 92b extends along the second direction B. The fifth portion 92a runs through the polymer layer 30 between the first portion 13e and the third portion 21e, and the sixth portion 92b runs through the polymer layer 30 between the second portion 13f and the fourth portion 21f.

In some embodiments, an extension length of each of the sixth portion 92b, the second portion 13f, and the fourth portion 21f along the second direction B is less than or equal to a thickness in the second direction B when the cover 20 covers the housing body 10.

The first sealing portion 13, the second sealing portion 21, and the tab 92 are bent to reduce the space occupied by the first sealing portion 13, the second bending portion 21, and the tab 92 in the first direction A, thereby increasing the energy density of the battery.

An embodiment of this application further provides a battery (not shown), including a cell 90 and a packaging housing 100. The packaging housing 100 is configured to package the cell 90. The packaging housing 100 may be the packaging housing according to any one of the foregoing embodiments.

In some embodiments, the battery further includes a circuit protection board (not shown). The circuit protection board is configured to monitor voltage, current, insulation status, state of charge, and the like of the battery cell 90 to provide safe management during charging and discharging of the battery, alarm and emergency protection for possible faults, and safety and optimization control for operation of the battery.

An embodiment of this application further provides an electric device (not shown), including the battery according to any one of the foregoing embodiments.

In the foregoing battery and electric device, the first sealing portion 13 and the second sealing portion 21 are disposed opposite to each other, and the polymer layer 30 is disposed between the first sealing portion 13 and the second sealing portion 21, improving sealing performance of the packaging housing 100. In addition, when pressure of gas generated by the cell 90 inside the packaging housing 100 exceeds the threshold, the polymer layer 30 is further configured to release the gas from the packaging housing 100, implementing timely pressure relief of the packaging housing 100 and improving use safety. Compared with the existing method of disposing a pressure relief valve on the packaging housing, the packaging housing 100 in the embodiment of this application can reduce production costs while improving safety.

In addition, those of ordinary skill in the art should be aware of that the foregoing embodiments are only intended to describe this application, but not to limit this application. Appropriate modifications and variations made to the foregoing embodiments without departing from the essential spirit and scope of this application all fall within the scope of this application.

What is claimed is:

1. A packaging housing for accommodating a cell, the cell comprising an electrode assembly and a tab electrically connected to the electrode assembly, characterized in that the packaging housing comprises:

a housing body provided with an accommodating portion, wherein the accommodating portion is configured to accommodate the electrode assembly, the tab extends from the accommodating portion to an outside of the housing body, and the housing body is further provided with a first sealing portion extending from an edge of an opening of the accommodating portion to the outside of the housing body along a first direction;

a cover provided with a second sealing portion extending along the first direction, wherein the cover covers the opening of the accommodating portion, and the first sealing portion and the second sealing portion are disposed opposite to each other; and a polymer layer disposed between the first sealing portion and the second sealing portion, wherein the polymer layer is configured to seal a gap between the first sealing portion and the second sealing portion; and when pressure of gas generated by the cell inside the packaging housing exceeds a threshold, the polymer layer is further configured to release the gas from the packaging housing;

wherein the first sealing portion comprises a first surface and a second surface, wherein the first surface faces toward the second sealing portion, the second surface connects to a side of the first surface facing away from the accommodating portion, the first surface and the second surface are connected to form a first step face, and the first step face is sealed to the polymer layer; and wherein the second sealing portion comprises a third surface and a fourth surface, wherein the third surface faces toward the first surface, the fourth surface connects to a side of the third surface corresponding to the second surface, the third surface and the fourth surface are connected to form a second step face, and the second step face is sealed to the polymer layer.

2. The packaging housing according to claim 1, wherein the tab protrudes from the polymer layer to the outside of the housing body.

3. The packaging housing according to claim 1, wherein the edge of the opening of the accommodating portion comprises a first edge and a second edge that are connected end to end, the first sealing portion extends from the first edge along the first direction, the housing body is further provided with a first connecting zone, the first connecting zone is provided on the second edge, a surface of the cover facing towards the accommodating portion is provided with a second connecting zone overlapping with the first connecting zone, and the first connecting zone and the second connecting zone are welded to form a welded connecting layer.

4. The packaging housing according to claim 3, wherein the second edge of the opening of the accommodating portion bends outward to form a bending portion, and the first connecting zone is provided on a surface of the bending portion facing towards the cover.

5. The packaging housing according to claim 3, wherein the housing body is further provided with a first dispensing zone, the first dispensing zone is provided in an intersection area between the first edge and the second edge, a surface of the cover facing towards the accommodating portion is provided with a second dispensing zone overlapping with the first dispensing zone, and the first dispensing zone and the second dispensing zone form a dispensing connecting layer through dispensing.

6. The packaging housing according to claim 1, wherein the packaging housing further comprises a tab adhesive layer, the polymer layer comprises a first melting layer and a second melting layer, wherein the tab adhesive layer is disposed between the first melting layer and the second melting layer, and the tab protrudes from the tab adhesive layer to the outside of the housing body.

7. A battery, comprising a cell and a packaging housing accommodating a cell, the cell comprising an electrode assembly and a tab electrically connected to the electrode assembly, wherein the packaging housing comprises:

a housing body provided with an accommodating portion, wherein the accommodating portion is configured to accommodate the electrode assembly, the tab extends from the accommodating portion to an outside of the housing body, and the housing body is further provided with a first sealing portion extending from an edge of an opening of the accommodating portion to the outside of the housing body along a first direction;

a cover provided with a second sealing portion extending along the first direction, wherein the cover covers the opening of the accommodating portion, and the first sealing portion and the second sealing portion are disposed opposite to each other; and a polymer layer disposed between the first sealing portion and the second sealing portion, wherein the polymer layer is configured to seal a gap between the first sealing portion and the second sealing portion, and when pressure of gas generated by the cell inside the packaging housing exceeds a threshold, the polymer layer is further configured to release the gas from the packaging housing;

wherein the first sealing portion comprises a first surface and a second surface, wherein the first surface faces toward the second sealing portion, the second surface connects to a side of the first surface far away from the accommodating portion, the first surface and the second surface are connected to form a first step face, and the first step face is sealed to the polymer layer; and wherein the second sealing portion comprises a third surface and a fourth surface, wherein the third surface faces toward the first surface, the fourth surface connects to a side of the third surface corresponding to the second surface, the third surface and the fourth surface are connected to form a second step face, and the second step face is sealed to the polymer layer.

8. The battery according to claim 7, wherein the tab protrudes from the polymer layer to the outside of the housing body.

9. The battery according to claim 7, wherein the edge of the opening of the accommodating portion comprises a first edge and a second edge that are connected end to end, the first sealing portion extends from the first edge along the first direction, the housing body is further provided with a first connecting zone, the first connecting zone is provided on the second edge, a surface of the cover facing towards the accommodating portion is provided with a second connecting zone overlapping with the first connecting zone, and the first connecting zone and the second connecting zone are welded to form a welded connecting layer.

10. The battery according to claim 9, wherein the second edge of the opening of the accommodating portion bends outward to form a bending portion, and the first connecting zone is provided on a surface of the bending portion facing towards the cover.

11. The battery according to claim 9, wherein the housing body is further provided with a first dispensing zone, the first dispensing zone is provided in an intersection area between the first edge and the second edge, a surface of the cover facing towards the accommodating portion is provided with a second dispensing zone overlapping with the first dispensing zone, and the first dispensing zone and the second dispensing zone form a dispensing connecting layer through dispensing.

12. The battery according to claim 7, wherein the packaging housing further comprises a tab adhesive layer, wherein the tab adhesive layer is disposed between a first melting layer of the polymer layer and a second melting layer of the polymer layer, and the tab protrudes from the tab adhesive layer to the outside of the housing body.

13. An electric device, comprising the battery, the battery comprising a cell and a packaging housing accommodating a cell, the cell comprising an electrode assembly and a tab electrically connected to the electrode assembly, wherein the packaging housing comprises:

a housing body provided with an accommodating portion, wherein the accommodating portion is configured to accommodate the electrode assembly, the tab extends from the accommodating portion to an outside of the housing body, and the housing body is further provided with a first sealing portion extending from an edge of an opening of the accommodating portion to the outside of the housing body along a first direction;

a cover provided with a second sealing portion extending along the first direction, wherein the cover covers the opening of the accommodating portion, and the first sealing portion and the second sealing portion are disposed opposite to each other; and a polymer layer disposed between the first sealing portion and the second sealing portion, wherein the polymer layer is configured to seal a gap between the first sealing portion and the second sealing portion, and when pressure of gas generated by the cell inside the packaging housing exceeds a threshold, the polymer layer is further configured to release the gas from the packaging housing;

wherein the first sealing portion comprises a first surface and a second surface, wherein the first surface faces toward the second sealing portion, the second surface connects to a side of the first surface far away from the accommodating portion, the first surface and the second surface are connected to form a first step face, and the first step face is sealed to the polymer layer; and wherein the second sealing portion comprises a third surface and a fourth surface, wherein the third surface faces toward the first surface, the fourth surface connects to a side of the third surface corresponding to the second surface, the third surface and the fourth surface are connected to form a second step face, and the second step face is sealed to the polymer layer.

* * * * *